United States Patent
Annampedu

(10) Patent No.: US 8,848,304 B2
(45) Date of Patent: Sep. 30, 2014

(54) METHODS AND APPARATUS FOR IMPROVED DETECTION OF SERVO SECTOR DATA USING SINGLE BIT ERROR CORRECTION

(75) Inventor: Viswanath Annampedu, Schnecksville, PA (US)

(73) Assignee: LSI Corporation, San Jose, CA (US)

( * ) Notice: Subject to any disclaimer, the term of this patent is extended or adjusted under 35 U.S.C. 154(b) by 37 days.

(21) Appl. No.: 13/559,747

(22) Filed: Jul. 27, 2012

(65) Prior Publication Data

US 2014/0029129 A1    Jan. 30, 2014

(51) Int. Cl.
G11B 5/09    (2006.01)
G11B 20/10    (2006.01)

(52) U.S. Cl.
USPC .............. 360/39; 360/40; 360/45; 360/48; 360/49; 360/53

(58) Field of Classification Search
None
See application file for complete search history.

(56) References Cited

U.S. PATENT DOCUMENTS

| | | | | |
|---|---|---|---|---|
| 5,828,676 A | * | 10/1998 | Hurlbut et al. | 714/752 |
| 6,005,727 A | * | 12/1999 | Behrens et al. | 360/48 |
| 6,543,024 B2 | * | 4/2003 | Gray | 714/769 |
| 6,831,808 B2 | * | 12/2004 | Ottesen et al. | 360/78.06 |
| 7,199,955 B2 | * | 4/2007 | Hirano et al. | 360/40 |
| 7,242,325 B2 | * | 7/2007 | Read | 341/58 |
| 7,251,770 B2 | * | 7/2007 | Bottomley et al. | 714/755 |
| 7,792,222 B2 | * | 9/2010 | Tang et al. | 375/341 |
| 7,800,853 B1 | * | 9/2010 | Guo et al. | 360/49 |
| 8,693,123 B1 | * | 4/2014 | Guo et al. | 360/49 |
| 2003/0067403 A1 | * | 4/2003 | Pozidis | 341/132 |
| 2005/0289429 A1 | * | 12/2005 | Bottomley et al. | 714/746 |
| 2006/0233286 A1 | * | 10/2006 | Annampedu et al. | 375/340 |
| 2008/0204926 A1 | * | 8/2008 | Blaum et al. | 360/77.05 |
| 2011/0205654 A1 | * | 8/2011 | Sakurai | 360/31 |
| 2012/0198304 A1 | * | 8/2012 | Kondo et al. | 714/758 |
| 2012/0198309 A1 | * | 8/2012 | Alves et al. | 714/763 |

* cited by examiner

*Primary Examiner* — Dismery Mercedes
(74) *Attorney, Agent, or Firm* — Hamilton DeSanctis & Cha

(57) ABSTRACT

Methods and apparatus are provided for improved detection of servo sector data in a magnetic recording system using single bit error correction. Servo sector data is processed by detecting the servo sector data; determining whether a single bit error occurred in the detected servo sector data; and flipping a bit value of an individual bit in the detected servo sector data having a lowest amplitude sample among the samples of the detected servo sector data when a single bit error is detected in the detected servo sector data. The servo sector data comprises, for example, a servo address mark, Gray data, an RRO address mark and/or RRO data. For example, the bit value can be flipped by changing a binary value of one to a binary value of zero and changing a binary value of zero to a binary value of one.

19 Claims, 4 Drawing Sheets

__US 8,848,304 B2__

METHODS AND APPARATUS FOR IMPROVED DETECTION OF SERVO SECTOR DATA USING SINGLE BIT ERROR CORRECTION

BACKGROUND

A read channel integrated circuit (IC) is one of the core electronic components in a modern hard disk drive. In a magnetic recording system, for example, a read channel converts and encodes data to enable magnetic recording heads to write data to a magnetic medium and to then read back the data accurately. The magnetic media in a magnetic recording system have a number of tracks and each track comprises "read" sectors, with "servo" sectors embedded between the read sectors. The information recorded in the servo sectors helps to position a magnetic recording head so that the user information stored in the read sectors can be retrieved properly.

The servo and read sectors both typically begin with the same known preamble pattern. The read preamble is followed by a read address mark and encoded user data. The servo preamble is followed by a servo address mark and various servo data, including encoded Gray data (often referred to as servo data).

U.S. patent application Ser. No. 13/281,923, filed Oct. 26, 2011, entitled "Methods and Apparatus for Validating Detection of RRO Address Marks," incorporated by reference herein, describes an exemplary magnetic recording system that encodes the servo sector using asynchronous Wide Bi Phase (WBP) encoding. Thus, a binary zero is encoded as "1100" and a binary one is encoded as "0011" to provide a large positive sample or a negative sample at the wide biphase code word boundary. The sample can be sliced with a threshold of zero to detect the servo data bits. When the samples are large, the servo data bits are properly detected. Due to noise, however, the amplitude of the samples may be lowered closer to zero, causing detection errors.

A need therefore exists for improved techniques for detecting servo sector data in a magnetic recording system.

SUMMARY

Illustrative embodiments of the invention provide methods and apparatus for improved detection of servo sector data in a magnetic recording system using single bit error correction. According to one embodiment of the invention, servo sector data is processed in a magnetic recording system by detecting the servo sector data; determining whether a single bit error occurred in the detected servo sector data; and flipping a bit value of an individual bit in the detected servo sector data having a lowest amplitude sample among the samples of the detected servo sector data when a single bit error is detected in the detected servo sector data. For example, the bit value can be flipped by changing a binary value of one to a binary value of zero and changing a binary value of zero to a binary value of one.

In one embodiment, a single bit error is detected by evaluating a parity bit associated with the detected servo sector data. In another embodiment, a single bit error is detected using system level information that indicates whether the servo sector data should have even or odd parity. In yet another embodiment, a single bit error is detected for a current servo sector based on whether servo sector data for one or more previous servo sectors have even or odd parity. The single bit error can also be detected by evaluating a parity of servo sector data on a track identified based on a burst demodulation field.

A more complete understanding of embodiments of the present invention will be obtained by reference to the following detailed description and drawings.

DETAILED DESCRIPTION

Embodiments of the invention will be illustrated herein in conjunction with exemplary magnetic recording devices, controllers and associated read channel techniques. It should be understood, however, that the this and other embodiments of the invention are more generally applicable to any magnetic recording system in which improved RRO address mark detection is desired, and may be implemented using components other than those specifically shown and described in conjunction with embodiments of the invention.

Embodiments of the invention provide techniques for improved detection of servo sector data using single bit error correction. Embodiments of the invention recognize that single bit errors are a significant source of errors in servo sector data. Thus, according to one embodiment of the invention, a parity bit is added to one or more fields of the servo sector data to ensure that the number of bits with the value one in the set of servo sector bits is even or odd. In this manner, the parity bit provides a mechanism for detecting a single bit error.

In addition, embodiments of the present invention recognize that the individual bit that experienced the error within the set of servo sector bits most likely corresponds to the sample having the lowest amplitude among the samples. Thus, in one embodiment, a parity bit is used to detect a single bit error in the servo sector data and when a single bit error is detected, the bit value of the sample having the lowest amplitude among the servo sector data samples is flipped (i.e., a binary value of one is changed to a binary value of zero and a binary value of zero is changed to a binary value of one).

Figure 1:
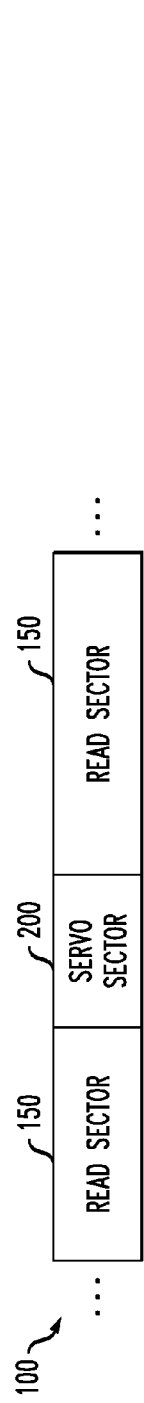
FIG. 1 illustrates a typical track format for recording servo sector information and read sector information on a magnetic medium.

FIG. 1 illustrates a typical track format 100 for recording servo sector information 200, as discussed further below in conjunction with FIG. 2, and read sector information 150 in a disk drive. In an embedded servo system, for example, there are typically approximately around 60 to 100 servo sectors 200 per track that consume about 10% of the surface area. The remaining 90% of the surface area is used for read sectors 150 to store user data information. As shown in FIG. 1, the servo sectors 200 and read sectors 150 typically alternate on a given track, such that each servo sector 200 is typically preceded by a read sector 150 and followed by a read sector 150.

Figure 2:
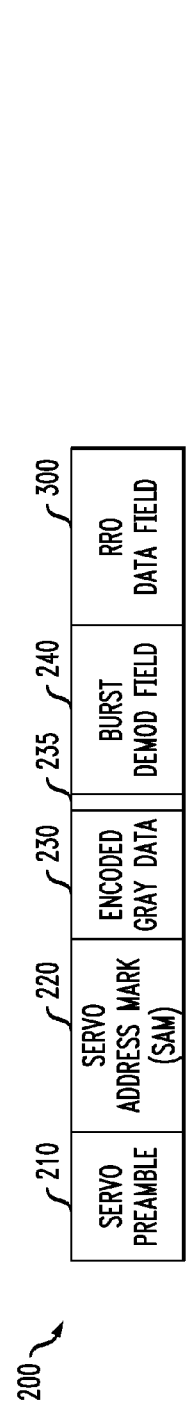
FIG. 2 illustrates a format for the servo sectors of FIG. 1 that incorporates embodiments of the present invention.

FIG. 2 illustrates a format of servo sector information 200 that incorporates embodiments of the present invention. As shown in FIG. 2, the servo sector information 200 comprises a preamble 210, such as a 2T preamble pattern, that allows the recording system to recover the timing and gain of the written servo data. The preamble 210 is typically followed by a servo address mark (SAM) 220 that is generally the same for all servo sectors and may then be followed by encoded Gray data 230. The Gray data 230 is followed by one or more burst demodulation fields 240. The burst demodulation fields 240 are followed by an RRO data field 300, as discussed further below in conjunction with FIG. 3. The SAM 220 comprises some fixed number of bits. The Gray data 230 represents the track number/cylinder information and serves as a coarse positioning for the magnetic recording head. The burst demodulation field(s) 240 serves as a fine positioning system for the head to be on track. The RRO data field 300 provides head positioning information that is finer than that provided by the Gray data 230 and more coarse than that provided by the burst demodulation field(s) 240.

In addition, according to one embodiment of the present invention, the servo sector information 200 is extended to include a parity bit field 235 following the Gray data 230. The parity bit in field 235 ensures that the number of bits with the value of one in the Gray data 230 is even or odd and permits detection of single bit errors.

Figure 3:
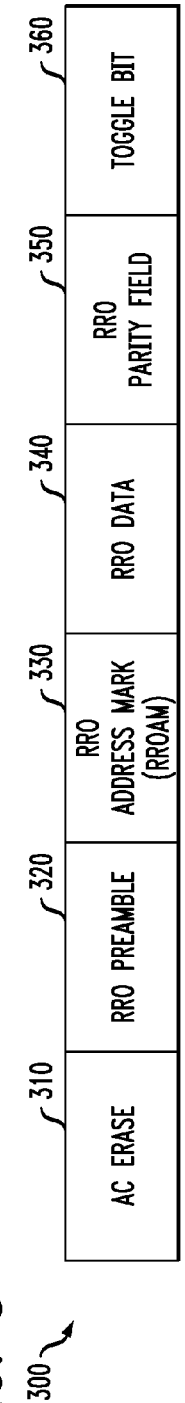
FIG. 3 illustrates a format for the RRO data field of FIG. 2.

FIG. 3 illustrates a format of the RRO data field 300. As shown in FIG. 3, the RRO data field 300 begins with an AC erase 310, which is typically a Nyquist pattern. The AC erase 310 is followed by an RRO Preamble 320 and the RRO address mark (RROAM) 330. The RROAM 330 is a bit pattern that is generally the same for all servo sectors. The RROAM 330 indicates when to start decoding RRO data and aids selection of the best sampling phase for decoding RRO data 340. RROAM 330 is followed RRO data 340, which includes head-positioning information. RRO data 340 is followed by an RRO parity field 350, which includes parity bits employed for error detection/correction. RRO parity field 350 is followed by a toggle bit 360, which brings the magnetization level to whatever the disk used in AC erase 310, in a known manner.

As previously indicated, the RROAM 330 can be any programmable pattern, such as a pattern of 01. The RROAM 330 is typically encoded using wide bi-phase encoding. Thus, a binary zero is encoded as "1100" and a binary one is encoded as "0011." If the RRO data field is not present in the servo sector, an AC erase pattern is typically written instead. If there is an error in the detected AC erase pattern due to noise, the AC erase pattern may be improperly detected as an RRO address mark. Thus, embodiments of the present invention provide techniques for validating the detection of RRO address marks.

In addition, as discussed hereinafter, parity bits can optionally be provided for one or more of the SAM 220, the RROAM 330 and the RRO data 340. In a further variation, the parity bit field provided by the present invention for one or more of the SAM 220, Gray data 230, RROAM 330 and/or RRO data 340 can be provided as a dedicated bit following the given field 220, 230, 330, 340 or included in the RRO data 340 or the RRO parity field 350.

Figure 4:
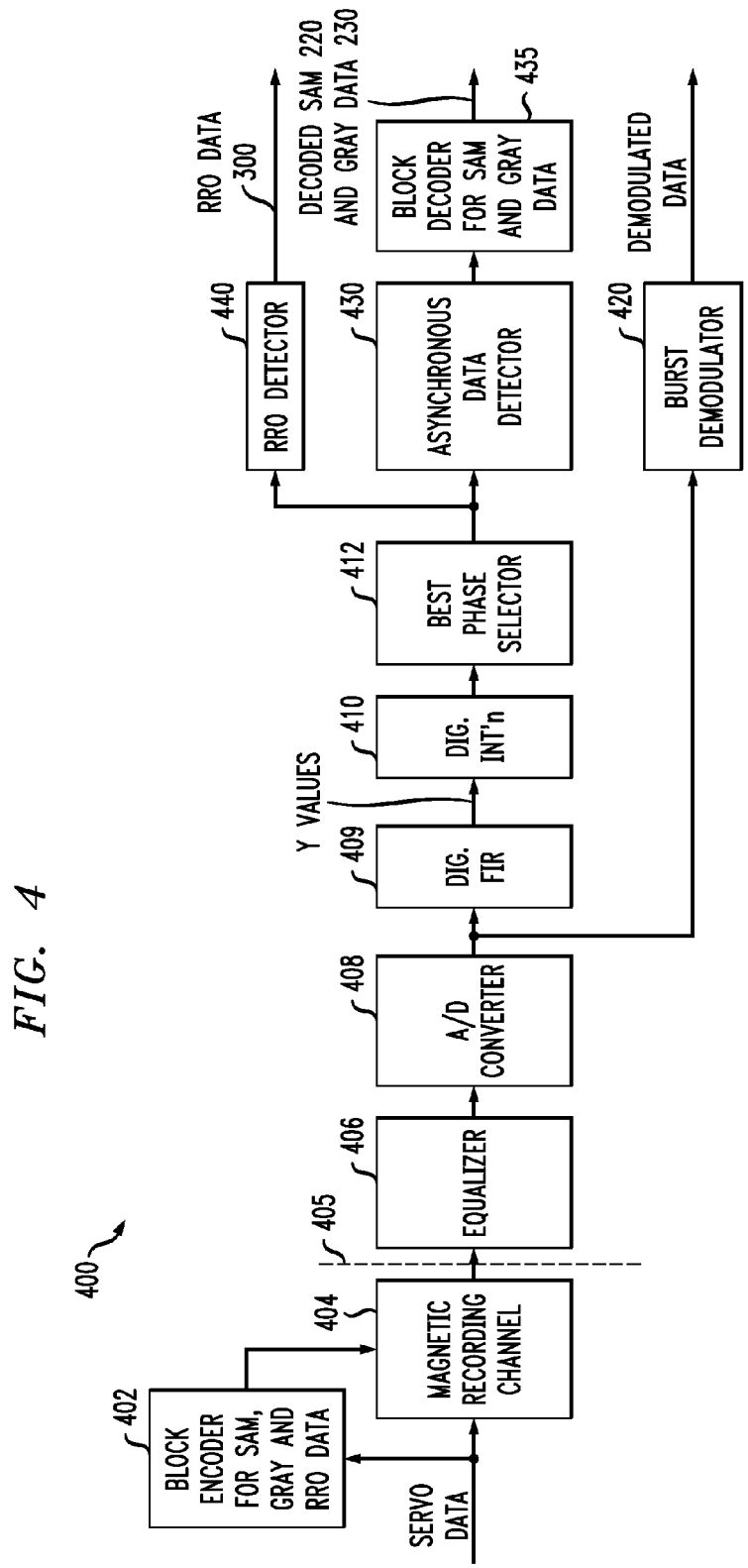
FIG. 4 is a block diagram illustrating a magnetic recording system in which embodiments of the present invention can be employed.

FIG. 4 is a block diagram illustrating a magnetic recording system 400 in which embodiments of the present invention can be employed. It is to be understood that the system 400 depicted in FIG. 4 is intended to illustrate the principles of the invention described herein. Portions of the magnetic recording system 400 may be implemented, for example, based on the teachings of U.S. Pat. No. 7,082,005, incorporated by reference herein.

As shown in FIG. 4, the magnetic recording system 400 comprises a servo data block encoder 402, a magnetic recording channel 404, an equalizer 406, for example, with a continuous time filter (CTF) (not shown), an analog-to-digital (A/D) converter 408, a digital FIR filter 409, digital interpolators 410, a best phase selector 412, a burst demodulator 420, an asynchronous data detector 430, a servo data block decoder 435, and an RRO detector 440. It is assumed that the servo data has the same format as shown and described in conjunction with FIGS. 2 and 3.

During a write operation, servo data 200 (FIG. 2) is encoded by the block encoder 402 and written to a magnetic medium such as a disk (denoted as 405) via the magnetic recording channel 404, in a known manner. Encoding by the block encoder 402 may be in accordance with any suitable encoding technique. Portions of the servo data 200 that are not encoded may also be written to the medium 405. Again, it is understood that a magnetic write head, while not expressly shown, is functionally interposed between the magnetic recording channel 404 and the magnetic medium 405 for writing data to the medium.

During a read operation, the servo data 200 (FIG. 2) is read from the magnetic medium 405 via a magnetic read head (not expressly shown but understood to be functionally interposed between the medium 405 and the equalizer 406) and then equalized by the equalizer 406. More specifically, a servo waveform corresponding to an encoded servo pattern is read back from the magnetic medium 405 and equalized, for example, by the CTF within the equalizer 406, in a known manner.

The waveform is then digitized by the A/D converter 408, as is also known. The input to the A/D converter 408 is typically a T symbol rate sampled target response equalized analog signal. It is to be understood that the techniques of the invention may be employed regardless of whether these T rate samples are asynchronously sampled or synchronously sampled with a conventional timing loop. As shown in FIG. 4, the digital values from the A/D converter 408 are processed by the burst demodulator 420 to fine position the magnetic read head over a given track of the magnetic medium 405, in a known manner.

The digital values at the output of the A/D converter 408 are also processed by a digital FIR filter 409 to generate symbol rate equalized A/D converter samples, referred to as 'Y' values, in a known manner. The 'Y' values are then interpolated using the digital interpolators 410 to generate interpolated values. The interpolated 'Y' values output by the digital interpolators 410 are then processed by a best phase selector 412. The best phase selector 412 selects a best phase of the combined stream of asynchronous sample values and interpolated 'Y' values. The best phase selector 412 may be implemented, for example, based on the teachings of United States Published Patent Application No. 2006/0233286, incorporated by reference herein. Generally, the best phase selector 412 employs a peak detection process to adjust a current best phase for sample selection.

The output of the best phase selector 412 is applied in parallel to an asynchronous data detector 430 and an RRO detector 440. The asynchronous data detector 430 detects the servo data and the block decoder 435 then decodes the detected data in accordance with the encoding technique implemented by the block encoder 402.

The RRO detector 440 processes the interpolated 'Y' values from the best phase selector 412 which represent asynchronous sample values having an arbitrary phase for the RRO data field 300. The RRO detector 440 detects the RRO data field 300, in a known manner.

Figure 5:
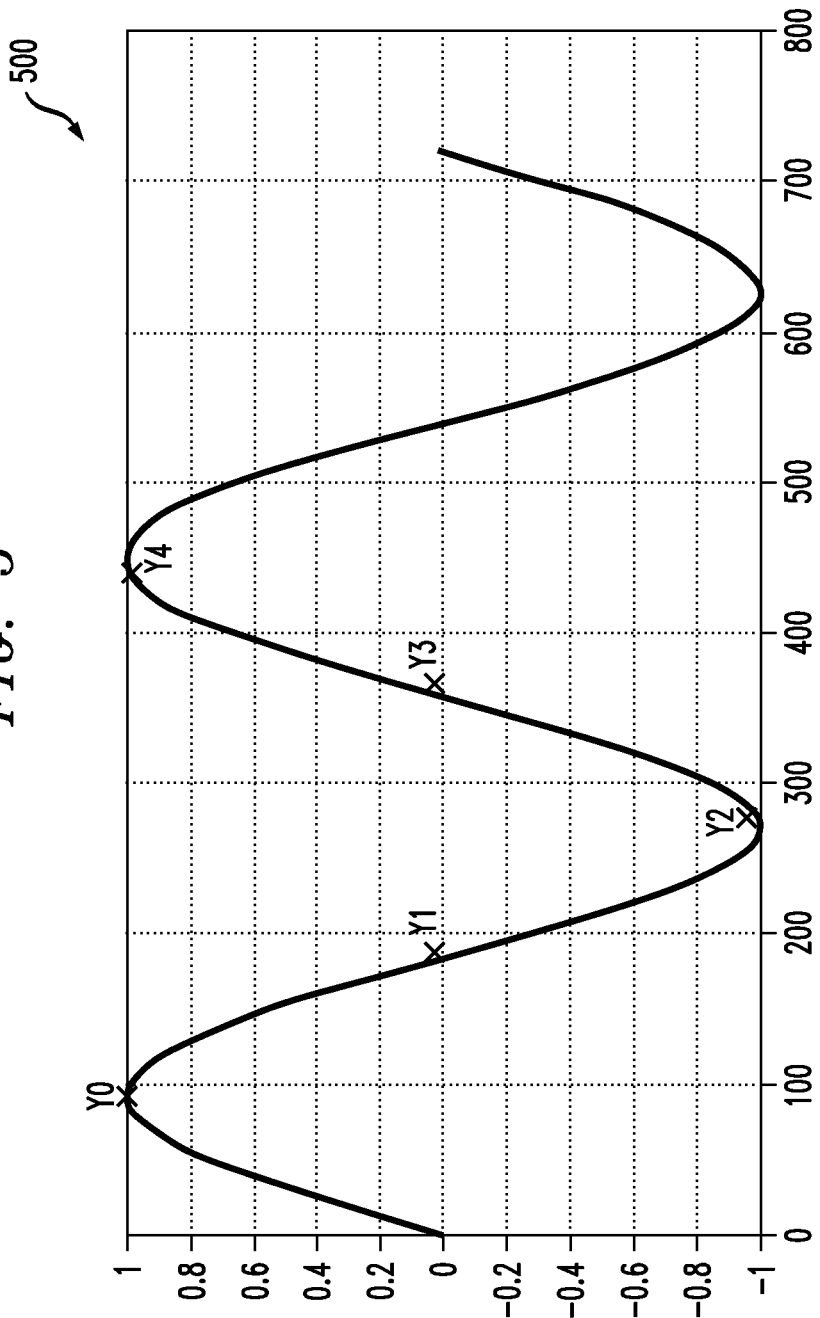
FIG. 5 illustrates a waveform comprising asynchronous sample points and interpolated sample points.

FIG. 5 illustrates a waveform including a peak sample point Y4 and three previous corresponding samples, Y3, Y2 and Y1 that are processed by the magnetic recording system 400 of FIG. 4. As indicated above, the best phase selector 412 selects a best phase of the combined stream of asynchronous sample values and interpolated 'Y' values. The absolute value of the sampled amplitude at the best phase is referred to as a peak sample, such as peak samples Y0 and Y4.

Detection of Single Bit Errors Using Parity Information

Embodiments of the present invention recognize that single bit errors are a significant source of errors in servo sector data 220, 230, 330, 340. Thus, according to one embodiment of the invention, one or more parity bits are added to the servo sector data to ensure that the number of bits for a given servo sector field 220, 230, 330, 340 with the value one in the field 220, 230, 330 or 340 of servo sector bits is even or odd. In this manner, the parity bit provides a mechanism for detecting a single bit error.

When using even parity, the parity bit is set to 1 if the number of ones in a given field 220, 230, 330, 340 of bits (not including the parity bit) is odd, making the number of ones in the entire set of bits (including the parity bit) even. If the number of ones in a given field 220, 230, 330, 340 of bits is already even, it is set to a 0. When using odd parity, the parity bit is set to 1 if the number of ones in a given field 220, 230, 330, 340 of bits (not including the parity bit) is even, keeping the number of ones in the entire field 220, 230, 330, 340 of bits (including the parity bit) odd. If the number of ones is already odd, the odd parity bit is set to 0. In other words, an even parity bit will be set to a value of one if the number of ones plus 1 is even, and an odd parity bit will be set to a value of if the number of ones plus 1 is odd.

If an odd number of bits (including the parity bit) are transmitted incorrectly, the parity bit will be incorrect and thus indicates that an error occurred in transmission. The parity bit can be used to detect the error.

In addition, further embodiments of the invention recognize that the individual bit that experienced the error within the set of servo sector bits in field 220, 230, 330 or 340 most likely corresponds to the sample having the lowest amplitude among the samples. In other words, the erroneous data bits come from data samples having magnitudes that are closer to zero (i.e., from samples of low amplitude). Thus, in one embodiment, a parity bit is used to detect a single bit error in the servo sector data and when a single bit error is detected, the bit value of the sample having the lowest amplitude among the servo sector data samples is flipped (i.e., a binary value of one is changed to a binary value of zero and a binary value of zero is changed to a binary value of one).

Figure 6:
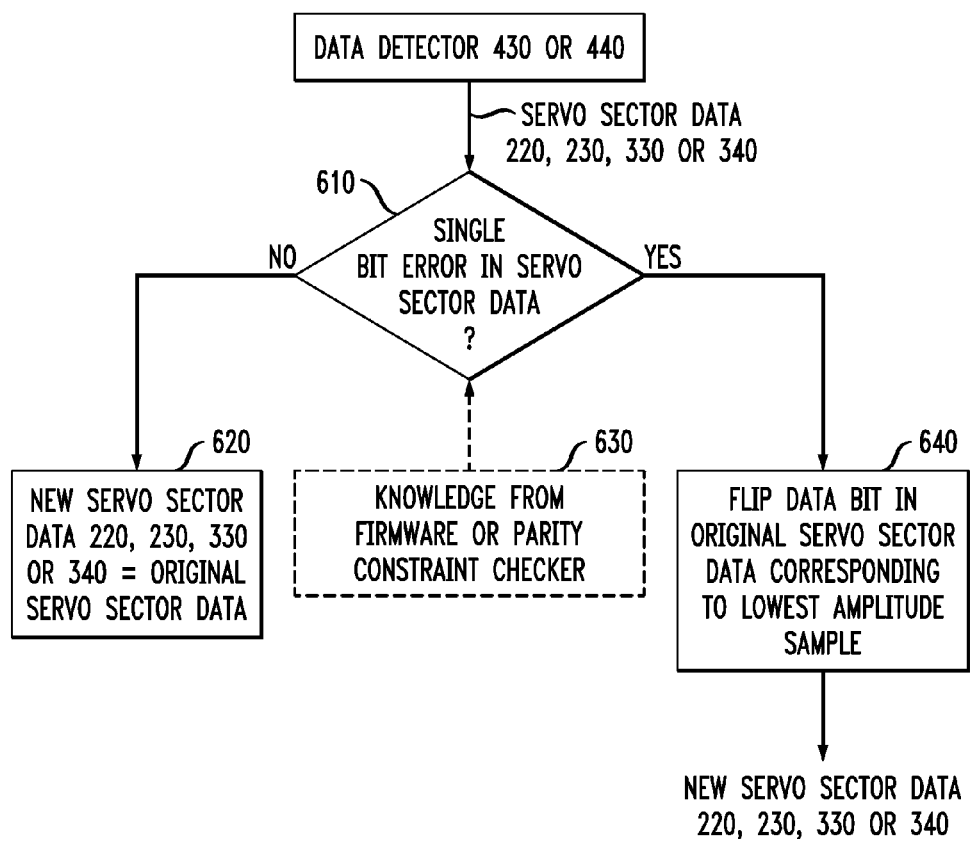
FIG. 6 is a flow chart describing a servo sector data detection process according to one embodiment of the invention.

FIG. 6 is a flow chart describing a servo sector data detection process 600 according to an embodiment of the invention. As shown in FIG. 6, the servo sector data detection process 600 receives the original servo sector data for field 220, 230, 330 or 340 from the asynchronous data detector 430 or RRO detector 440. A test is performed during step 610 to determine if a single bit error occurred in the servo sector data. The test performed during step 610 is based on knowledge from the firmware or a parity constraint checker 630. A number of exemplary techniques for detecting the bit error are discussed below in the section entitled "Single Bit Error Detection."

If it is determined during step 610 that a single bit error did not occur in the servo sector data, then the original servo sector data 220, 230, 330 or 340 is not changed during step 620. If, however, it is determined during step 530 that 610 that a single bit error did occur in the servo sector data, then the value of the data bit in the original servo sector data 220, 230, 330 or 340 having the lowest amplitude sample is flipped during step 640 to generate new servo sector data 220, 230, 330 or 340.

Single Bit Error Detection

A. Gray Data 230

In one embodiment, the single bit error is detected for Gray data 230 using a Gray parity bit 235 after the last bit of Gray data 230, as shown in FIG. 2. A parity constraint checker will process the Gray parity bit 235 to determine if the parity constraint is satisfied in the detected data stream. As indicated above, the Gray parity bit can alternatively be provided as an additional bit in the RRO data field 340 or the RRO parity field 350.

In another embodiment, the single bit error is detected using system level information. The servo controller may know whether the servo sector being processed by the read channel is supposed to have an even or odd Gray code 230. For example, all of the servo sectors 200 on the same track of the magnetic recording medium have the same Gray data 230 (i.e., the same track identifier). In other words, all of the Gray data 230 on the same track will have the same parity (even or odd). The servo controller can then forward the known parity information to the servo detector 430. Thus, the parity is known based on the position of the track on the magnetic media (and a parity bit need not be written to determine the parity).

In yet another embodiment, the single bit error can be detected based on the Gray data 230 from previous servo sectors. If the Gray data 230 from a predefined number of initial sectors on a track have either an even or odd parity, then the detected parity for the previous Gray data 230 can be used for all sectors in a given track.

A further embodiment recognizes that when the read head is off-track, there will be an indeterminate bit between Gray codes 230 of adjacent tracks. The burst demodulator field 240 can be used to resolve the indeterminate bit, in a known manner. The read head can be on track, on an adjacent track or in between tracks. The burst demodulator field 240 indicates the degree to which the read head is off track and can be used to identify the proper track to read. Typically, if the burst demodulator field 240 indicates a value of greater than or equal to 50%, the upper track is used and if the burst demodulator field 240 indicates a value below 50%, the lower adjacent track is used. By design, Gray codes 230 on adjacent tracks only differ in one bit position.

When the read head is equally between two tracks (50% off track; i.e., worst case scenario), the two adjacent tracks are read, and each will have a Gray data field 230 that differs by only one bit. Since the Gray codes 230 on adjacent tracks only differ in one bit position, the effective read-back signal for the Gray code 230 will have a small sample value for the corresponding indeterminate data bit. The burst demodulator field 240 indicates which adjacent track to read and which Gray data field 230 should be used for the parity check. Thus, based on the indeterminate bit resolution and whether or not the read head is on track using burst demodulation, the Gray parity can be determined, as an indicator of whether a single bit error occurred. Embodiment of the invention recognize that the lowest amplitude sample corresponds to the indeterminate bit, and that the indeterminate bit will be resolved by the burst demodulator field 240. Thus, when the read head is off-track, the lowest amplitude indeterminate bit is not flipped, and the next lowest amplitude sample is flipped in the presence of a parity error in accordance with the present invention.

B. Servo Address Mark 220

When servo information is initially formatted to the magnetic media, the SAM (220) is known and is constant for all servo sectors in all servo tracks on the media. Thus, the SAM pattern 220 will be known to have even or odd parity. The SAM 220 is detected by comparing a predefined number of detected bits (corresponding to the length of the SAM 220) to the expected SAM pattern 220, every time a bit is detected. If there is a match, the SAM 220 is detected. For example, assume that an exemplary 9 bit SAM pattern 220 comprises 000100101. The detected bits are shifted into a shift register and for every detected bit, 9 bits in the shift register are compared to the expected SAM pattern. When there is a match, the SAM 220 is said to be detected. During the process of comparing the predefined number of detected bits to the expected SAM pattern, if parity is violated and if flipping the low amplitude sample provides a match to the expected SAM pattern, then the SAM 220 is detected.

C. RRO Address Mark 330

The RRO Address Mark 330 is processed in a similar manner as the SAM 220. The single bit error can be detected using system level information for the RROAM 330 (e.g., the RROAM pattern is known based on the servo sector being processed). The RROAM pattern 330 will be known to have even or odd parity. The RROAM pattern 330 is detected by comparing a predefined number of detected bits (corresponding to the length of the RROAM pattern 330) to the expected RROAM pattern 330, every time a bit is detected. If there is a match, the RROAM pattern 330 is detected. For example, assume that an exemplary 9 bit RROAM pattern 330 comprises 000100101. The detected bits are shifted into a shift register and for every detected bit, 9 bits in the shift register are compared to the expected RROAM pattern. When there is a match, the RROAM pattern 330 is said to be detected. During the process of comparing the predefined number of detected bits to the expected RROAM pattern, if parity is violated and if flipping the low amplitude sample provides a match to the expected RROAM pattern, then the RROAM pattern 330 is detected.

It is noted that the RRO 330 and the corresponding RROAM parity bit are written by the read channel.

D. RRO Data 340

A single bit error is detected in the RRO data 340 based on the parity information in the RRO parity field 350. If parity is violated, the lowest amplitude sample among the samples in in the RRO data 340 will be flipped.

As previously indicated, the arrangements of magnetic recording systems and read channels, as described herein, provide a number of advantages relative to conventional arrangements. Again, it should be emphasized that the above-described embodiments of the invention are intended to be illustrative only. In general, the exemplary magnetic recording systems can be modified, as would be apparent to a person of ordinary skill in the art, to incorporate improved servo data detection using single bit error detection. In addition, the disclosed servo data detection techniques can be employed in any magnetic recording system. A number of exemplary single bit error detection techniques have been presented. Alternative single bit error detection mechanisms can be employed, as would be readily apparent to a person of ordinary skill in the art based on the disclosure herein.

While embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

In an integrated circuit embodiment of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Thus, the functions of embodiments of the invention can be embodied in the form of methods and apparatuses for practicing those methods. One or more embodiments of the invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The embodiments can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

I claim:

1. A method for processing servo sector data in a magnetic recording system, comprising:
   detecting said servo sector data;
   determining whether a single bit error occurred in said detected servo sector data without evaluating a parity bit in said detected servo sector data; and
   flipping a bit value of an individual bit in any bit position of said detected servo sector data having a lowest amplitude sample among the samples of said detected servo sector data when a single bit error is detected in said detected servo sector data.

2. The method of claim 1, wherein said step of flipping said bit value comprises changing a binary value of one to a binary value of zero and changing a binary value of zero to a binary value of one.

3. The method of claim 1, wherein said step of determining whether a single bit error occurred uses system level information that indicates whether said servo sector data should have even or odd parity.

4. The method of claim 1, wherein said step of determining whether a single bit error occurred for a current servo sector is based on whether one or more previous servo sectors have servo sector data with even or odd parity.

5. The method of claim 1, wherein said step of determining whether a single bit error occurred further comprises evaluating a parity of servo sector data on a track identified based on a burst demodulation field.

6. The method of claim 5, wherein said step of flipping a bit value of an individual bit comprises flipping a bit value of an individual bit having a second lowest amplitude sample among the samples of said detected servo sector data in the presence of an indeterminate bit in said detected servo sector data.

7. The method of claim 1, wherein said servo sector data comprises one or more of a servo address mark, Gray data, an RRO address mark and RRO data.

8. An apparatus for processing servo sector data in a magnetic recording system, comprising:
a memory; and
at least one hardware device, coupled to the memory, operative to:
detect said servo sector data;
determine whether a single bit error occurred in any bit position of said detected servo sector data without evaluating a parity bit in said detected servo sector data; and
flip a bit value of an individual bit in said detected servo sector data having a lowest amplitude sample among the samples of said detected servo sector data when a single bit error is detected in said detected servo sector data.

9. The apparatus of claim 8, wherein said bit value is flipped by changing a binary value of one to a binary value of zero and changing a binary value of zero to a binary value of one.

10. The apparatus of claim 8, wherein said single bit error is detected by using system level information that indicates whether said servo sector data should have even or odd parity.

11. The apparatus of claim 8, wherein said single bit error is detected for a current servo sector based on whether one or more previous servo sectors have servo sector data with even or odd parity.

12. The apparatus of claim 8, wherein said single bit error is detected by evaluating a parity of servo sector data on a track identified based on a burst demodulation field.

13. The apparatus of claim 12, wherein a bit value of an individual bit having a second lowest amplitude sample among the samples of said detected servo sector data is flipped in the presence of an indeterminate bit in said detected servo sector data.

14. The apparatus of claim 8, wherein said servo sector data comprises one or more of a servo address mark, Gray data, an RRO address mark and RRO data.

15. A servo sector data detector, comprising:
means for detecting said servo sector data obtained from a magnetic medium;
a parity constraint checker for determining whether a single bit error occurred in any bit position of said detected servo sector data without evaluating a parity bit in said detected servo sector data; and
means for flipping a bit value of an individual bit in said detected servo sector data having a lowest amplitude sample among the samples of said detected servo sector data when a single bit error is detected in said detected servo sector data.

16. The servo sector data detector of claim 15, wherein said means for flipping said bit value flips said individual bit value by changing a binary value of one to a binary value of zero and changing a binary value of zero to a binary value of one.

17. The servo sector data detector of claim 15, wherein said parity constraint checker detects said single bit error using system level information that indicates whether said servo sector data should have even or odd parity.

18. The servo sector data detector of claim 15, wherein said parity constraint checker detects said single bit error for a current servo sector based on whether one or more previous servo sectors have servo sector data with even or odd parity.

19. The servo sector data detector of claim 15, wherein said parity constraint checker detects said single bit error by evaluating a parity of servo sector data on a track identified based on a burst demodulation field.

* * * * *